(12) United States Patent
Fu et al.

(10) Patent No.: US 11,293,512 B2
(45) Date of Patent: Apr. 5, 2022

(54) MULTI-DIMENSIONAL EDDY CURRENT TUNED MASS DAMPER

(71) Applicant: DALIAN UNIVERSITY OF TECHNOLOGY, Liaoning (CN)

(72) Inventors: Xing Fu, Liaoning (CN); Hongnan Li, Liaoning (CN); Jia Wang, Liaoning (CN); Wenlong Du, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 208 days.

(21) Appl. No.: 16/761,378

(22) PCT Filed: Oct. 18, 2018

(86) PCT No.: PCT/CN2018/110858
§ 371 (c)(1),
(2) Date: May 4, 2020

(87) PCT Pub. No.: WO2020/077595
PCT Pub. Date: Apr. 23, 2020

(65) Prior Publication Data
US 2020/0362933 A1     Nov. 19, 2020

(51) Int. Cl.
*F16F 7/10* (2006.01)
*F16F 7/104* (2006.01)
(Continued)

(52) U.S. Cl.
CPC ............ *F16F 7/1011* (2013.01); *F16F 7/104* (2013.01); *E01D 19/00* (2013.01); *E04B 1/98* (2013.01);
(Continued)

(58) Field of Classification Search
CPC ...... F16F 7/1011; F16F 7/104; F16F 2222/06; F16F 2222/08; F16F 2224/0208;
(Continued)

(56) References Cited

FOREIGN PATENT DOCUMENTS

| CN | 105887661 A | 8/2016 |
|---|---|---|
| CN | 107061599 A * | 8/2017 |

(Continued)

*Primary Examiner* — Xuan Lan Nguyen
(74) *Attorney, Agent, or Firm* — Muncy, Geissler, Olds & Lowe, P.C.

(57) ABSTRACT

The present invention discloses a multi-dimensional eddy current tuned mass damper, which belongs to the technical field of structural vibration control. A main body of the multi-dimensional eddy current tuned mass damper is composed of two hollow cylinders, wherein an inner hollow cylinder is located in an outer hollow cylinder, ball grooves are formed in the opposite upper and lower walls of the inner and outer hollow cylinders, rolling balls are installed in the ball grooves, and the inner hollow cylinder is rotated in the outer hollow cylinder through the rolling balls; the inner hollow cylinder is provided with an inner cover plate, and the outer hollow cylinder is provided with an outer cover plate, forming a relatively closed box body structure; an orthogonal bidirectional mass element, a stiffness element and an eddy current damping element are arranged in the inner hollow cylinder, and a torsional stiffness element and an eddy current damping element are arranged between the inner hollow cylinder and the outer hollow cylinder. The multi-dimensional eddy current tuned mass damper of the present invention is not only convenient to adjust in terms of mass, stiffness and damping parameters, but also has regular and beautiful appearance, simple structure, and very simple connection with a main structure.

2 Claims, 2 Drawing Sheets

(51) Int. Cl.
*E01D 19/00* (2006.01)
*E04B 1/98* (2006.01)

(52) U.S. Cl.
CPC ....... *F16F 2222/06* (2013.01); *F16F 2222/08* (2013.01); *F16F 2224/0208* (2013.01); *F16F 2228/066* (2013.01); *F16F 2230/18* (2013.01)

(58) Field of Classification Search
CPC . F16F 2228/066; F16F 2230/18; E01D 19/00; E04B 1/98
See application file for complete search history.

(56) References Cited

FOREIGN PATENT DOCUMENTS

| | | | | |
|---|---|---|---|---|
| CN | 206759010 U | * | 12/2017 | |
| CN | 108166641 A | * | 6/2018 | ............ E01D 21/00 |
| EP | 2696072 A1 | * | 2/2014 | ............ F16F 15/035 |
| WO | WO 2007/108693 A1 | | 9/2007 | |

\* cited by examiner

MULTI-DIMENSIONAL EDDY CURRENT TUNED MASS DAMPER

TECHNICAL FIELD

The present invention belongs to the technical field of structural vibration control, and particularly relates to a multi-dimensional eddy current tuned mass damper.

BACKGROUND

With the development of the country, the importance of structures such as high-rise buildings, towering structures and large-span structures is increasing day by day. Under the action of dynamic loads such as strong wind and earthquake, these structures will be subject to relatively strong vibration, which will affect the normal use and safety of the structures. Structural vibration control is to dissipate or isolate the effect of external excitation on a structure by arranging a vibration reduction or vibration isolation device in the structure. At present, the research and development of vibration control devices are mostly focused on passive control devices which have the advantages of simple structure and no need of manual intervention; among these devices, a Tuned Mass Damper (TMD) is a type of passive control device that is widely used.

A traditional TMD can only effectively control the vibration of a structure in a certain direction, and the structure will inevitably vibrate in multiple directions under various load excitations; therefore, multi-dimensional vibration reduction has become a technical problem eager to be solved at home and abroad. In order to ensure the reliability of structural vibration control by dampers, it is usually necessary to arrange dampers in the directions of both main axes of the structure, so that the cost of structural vibration control is greatly increased. Therefore, considering the complexity of structural vibration, the traditional TMD cannot perfectly meet the needs of engineering vibration control.

Eddy current damping technology is based on the law of electromagnetic induction to convert mechanical energy of object motion into electrical energy in a conductor plate, and then convert the electrical energy into thermal energy through the thermal resistance effect of the conductor plate to dissipate the vibrational energy of a system. After the conductor plate moves in a magnetic field and generates an eddy current, the eddy current will interact with the original magnetic field to generate a damping force that hinders the relative motion of the conductor plate and the magnetic field; at the same time, the eddy current generated in the conductor plate is continuously dissipated to the surrounding environment in the form of thermal energy. Eddy current damping technology adopts a non-contact energy dissipation method, which has the advantages of good durability, long life and easy damping adjustment, and is widely used.

In view of the defects in the existing unidimensional vibration reduction devices, the present invention provides a multi-dimensional eddy current tuned mass damper by combining eddy current damping technology with other passive vibration reduction technologies. The device has the characteristics of modular production, convenient installation, convenient maintenance and simple use, and has a very broad market prospect.

SUMMARY

The present invention provides a multi-dimensional eddy current tuned mass damper by combining eddy current damping technology with other passive vibration reduction technologies. The vibration of a structure in horizontal direction and torsional direction is controlled by arranging orthogonal bidirectional mass-stiffness-damping elements and torsional stiffness-damping elements.

The technical solution of the present invention is:

A multi-dimensional eddy current tuned mass damper, comprising hollow cylinders, cover plates, rolling balls, a copper ring 2, connecting plates 4, permanent magnets 5, mass blocks 8, limiting angle steels 9, copperplates 10, vertical poles 11, horizontal poles 12, tension springs 13 and torsion springs 15;

a main body of the multi-dimensional eddy current tuned mass damper is composed of two hollow cylinders, wherein an inner hollow cylinder 3 is located in an outer hollow cylinder 1, ball grooves a 19 are formed in the opposite upper and lower walls of the inner and outer hollow cylinders, rolling balls a 6 are installed in the ball grooves a 19, and the inner hollow cylinder 3 is rotated in the outer hollow cylinder 1 through the rolling balls a 6; the inner hollow cylinder 3 is provided with an inner cover plate 18, and the outer hollow cylinder 1 is provided with an outer cover plate 17, forming a relatively closed box body structure;

an orthogonal bidirectional mass element, a stiffness element and an eddy current damping element are arranged in the inner hollow cylinder 3, and a torsional stiffness element and an eddy current damping element are arranged between the inner hollow cylinder 3 and the outer hollow cylinder 1;

the orthogonal bidirectional mass element is mainly composed of the connecting plates 4 and the mass blocks 8, two connecting plates 4 are horizontal and perpendicular to each other to form a cross, and both ends of each connecting plate are fixedly connected with the mass blocks 8; ball grooves b 7 are formed in the mass blocks 8 and the opposite upper and lower walls of the inner hollow cylinder 3, rolling balls b 14 are installed in the ball grooves b 7, the mass blocks 8 slide in the inner hollow cylinder 3 through the rolling balls b 14, and the limiting angle steels 9 are arranged on both ends of each mass block 8 along the moving direction to avoid collision between adjacent mass blocks 8;

the stiffness element is mainly composed of the vertical poles 11, the horizontal poles 12 and the tension springs 13, each horizontal pole 12 penetrates through a pore canal preformed in the connecting plates 4, and the horizontal poles 12 are parallel to the motion track of each corresponding mass block 8; the tension springs 13 are sheathed on both ends of each horizontal pole 12 and limited between the connecting plates 4 and the vertical poles 11; both ends of each vertical pole 11 are respectively in rigid connection with the horizontal poles 12 and the bottom surface of the inner hollow cylinder 3;

the eddy current damping element in the inner hollow cylinder 3 is mainly composed of the permanent magnets 5 and the copperplates 10, the permanent magnets 5 are embedded in pore spaces preformed in a side wall of the inner hollow cylinder 3, and the copperplates 10 are fixed on one side of each mass block 8;

the torsional stiffness element is composed of the torsion springs 15 which are respectively fixed between the inner cover plate 18 and the outer cover plate 17 and between the bottom of the inner hollow cylinder 3 and the bottom of the outer hollow cylinder 1;

the eddy current damping element in the outer hollow cylinder 1 is mainly composed of the permanent magnets 5 and the copper ring 2, and the copper ring 2 is fixed on an inner wall of the outer hollow cylinder 1;

the outer hollow cylinder 1, the inner hollow cylinder 3, the connecting plates 4 and the mass blocks 8 are all made of magnetic conductive materials; and the rolling balls are spherical steel balls.

The present invention has the operating principle that:

(1) When the structure is subject to multi-dimensional vibration, the horizontal vibration component can be controlled by the orthogonal bidirectional mass-stiffness-damping elements in an inner box body;

(2) Since an outer box body is fixed on a main structure and vibrates together with the structure, the rotation of the inner box body lags behind that of the outer box body due to inertia, which drives the permanent magnets to rotate, causes the copper ring to cut the magnetic inductance lines and generate eddy current damping, and controls the torsional vibration component of the structure.

The present invention has the following beneficial effects:

(1) The multi-dimensional eddy current tuned mass damper of the present invention has a multi-dimensional vibration reduction mechanism. When the structure is subject to multi-dimensional vibration, the horizontal vibration of the structure is controlled by the orthogonal bidirectional mass-stiffness-damping elements in the inner box body, and the torsional vibration of the structure is controlled by the torsional stiffness-damping elements due to the lagged rotation between the inner box body and the outer inner box body;

(2) The multi-dimensional eddy current tuned mass damper of the present invention is convenient to adjust in terms of mass, stiffness and damping parameters. The mass parameter of the damper can be controlled by adjusting the mass of the mass blocks; the stiffness parameter of the damper can be controlled by adjusting the tension springs and the torsion springs; and the damping parameter can be adjusted by adjusting the distance between the permanent magnets and the copper ring or copperplates, or adjusting the magnetic field intensity of the permanent magnets;

(3) The multi-dimensional eddy current tuned mass damper of the present invention uses the permanent magnets to provide a continuous magnetic field, and does not need any external energy. Since the physical properties of each control element remain unchanged for a long time, the device can provide a long-term stable vibration reduction effect;

(4) The multi-dimensional eddy current tuned mass damper of the present invention has the inner and outer box bodies made of magnetic conductive materials, which can effectively avoid magnetic leakage in magnetic circuit, so that the efficiency of eddy current damping is increased, and the influence on various components and parts around is avoided;

(5) The multi-dimensional eddy current tuned mass damper of the present invention has regular and beautiful appearance, simple structure, and very simple connection with a main structure.

Figure 1:
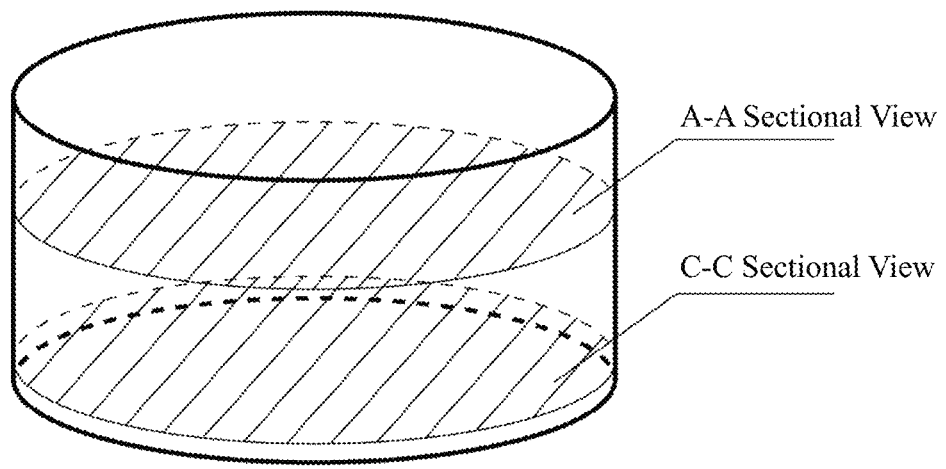
FIG. 1 is a global three-dimensional diagram of a multi-dimensional eddy current tuned mass damper provided in embodiments of the present invention.

In the drawings: 1 outer hollow cylinder; 2 copper ring; 3 inner hollow cylinder; 4 connecting plate; 5 permanent magnet; 6 rolling ball a; 7 ball groove b; 8 mass block; 9 limiting angle steel; 10 copperplate; 11 vertical pole; 12 horizontal pole; 13 tension spring; 14 rolling ball b; 15 torsion spring; 16 bolt; 17 outer cover plate; 18 inner cover plate; and 19 ball groove a;

DETAILED DESCRIPTION

To make a purpose, characteristics and advantages of the present invention more clear and legible, the technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 2:
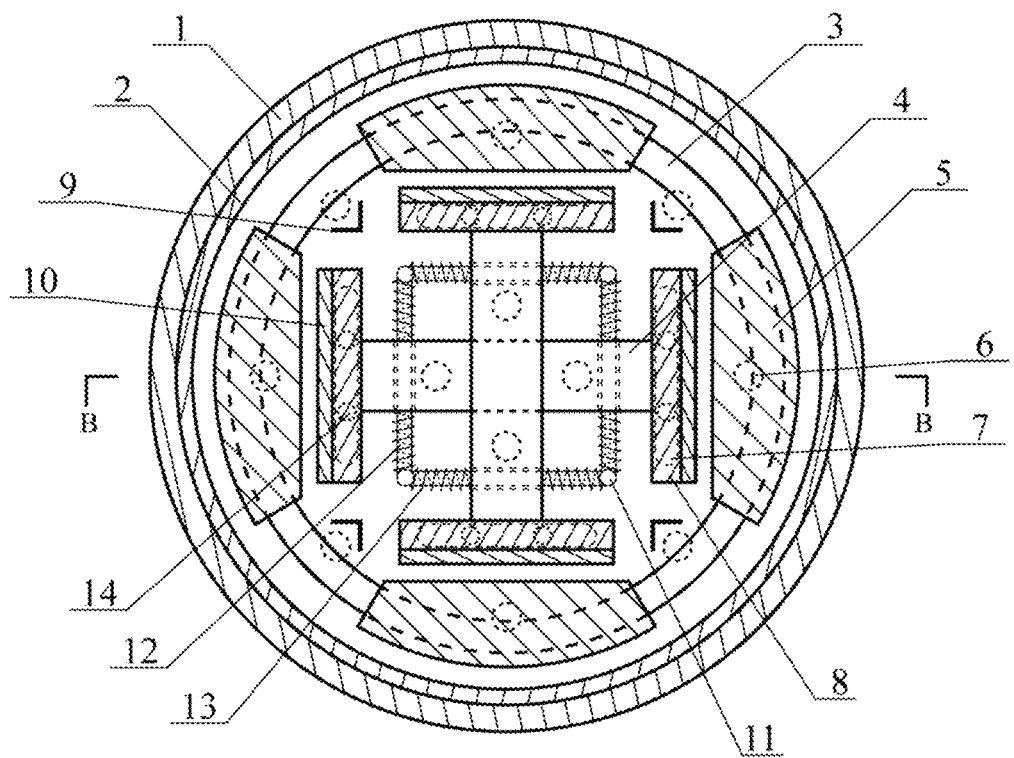
FIG. 2 is an A-A sectional view of a multi-dimensional eddy current tuned mass damper provided in embodiments of the present invention.
Figure 3:
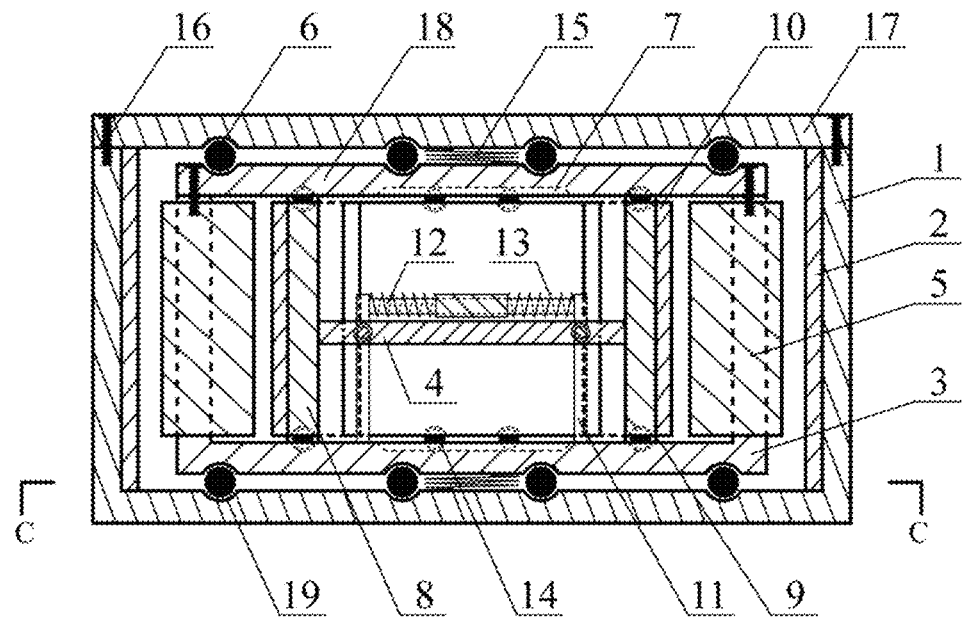
FIG. 3 is a B-B sectional view of a multi-dimensional eddy current tuned mass damper provided in embodiments of the present invention.
Figure 4:
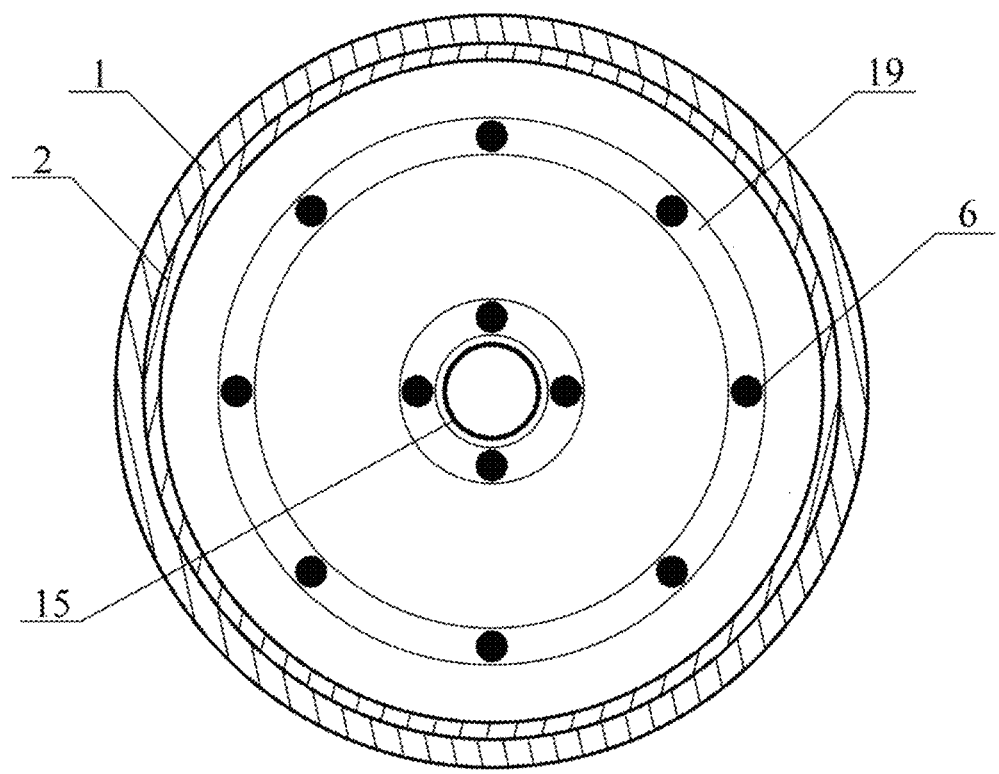
FIG. 4 is a C-C sectional view of a multi-dimensional eddy current tuned mass damper provided in embodiments of the present invention.

Refer to FIG. 1 to FIG. 4, an embodiment of a multi-dimensional eddy current tuned mass damper provided in embodiments of the present invention, comprising an outer hollow cylinder 1, a copper ring 2, an inner hollow cylinder 3, connecting plates 4, permanent magnets 5, rolling balls a 6, ball grooves b 7, mass blocks 8, limiting angle steels 9, copperplates 10, vertical poles 11, horizontal poles 12, tension springs 13, rolling balls b 14, torsion springs 15, bolts 16, an outer cover plate 17, an inner cover plate 18 and ball grooves a 19.

In the embodiment, the outer hollow cylinder 1 and the outer cover plate 17 are connected by bolts 16 to form an outer box body, the inner hollow cylinder 3 and the inner cover plate 18 are connected by bolts 16 to form an inner box body, and the inner box body is rotated in the ball grooves a 19 formed in upper and lower inner walls of the outer box body through the rolling balls a 6;

The connecting plates 4 are placed horizontally and perpendicular to each other to form a cross, both ends of each connecting plate are fixedly connected with the mass blocks 8, the mass blocks 8 slide in the ball grooves b 7 formed in upper and lower inner walls of the inner box body through the rolling balls b 14, and the limiting angle steels 9 are arranged on both ends of each mass block 8 along the moving direction to avoid collision between adjacent mass blocks 8;

The permanent magnets 5 are embedded in pore spaces preformed in a side wall of the inner box body, the copperplates 10 are fixed on one side of each mass block 8, and the copper ring 2 is fixed on an inner wall of the outer box body;

The horizontal poles 12 penetrate through pore canals preformed in the connecting plates 4 and are parallel to the motion tracks of the mass blocks 8, the tension springs 13 are sheathed on the horizontal poles 12 and arranged on both sides of each connecting plate 4, and both ends of each vertical pole 11 are respectively in rigid connection with the horizontal poles 12 and the bottom surface of the inner box body;

One torsion spring 15 is fixed between the inner cover plate 18 and the outer cover plate 17, and the other torsion spring 15 is fixed between the bottom of the outer hollow cylinder 1 and the bottom of the inner hollow cylinder 3;

The outer hollow cylinder 1, the inner hollow cylinder 3, the outer cover plate 17, the inner cover plate 18, the mass blocks 8 and the connecting plates 4 are all made of magnetic conductive materials; and the rolling balls a 6 and the rolling balls b 14 are spherical steel balls.

In the embodiment, the mass element is composed of the mass blocks 8 and the connecting plates 4; the stiffness element is composed of the horizontal poles 12, the vertical poles 11 and the tension springs 13; the eddy current damping element in the inner box body is composed of the permanent magnets 5 and the copperplates 10; the torsional stiffness element is composed of the torsion springs 15; and the eddy current damping element in the outer box body is composed of the permanent magnets 5 and the copper ring 2. When the structure is subject to multi-dimensional vibration, the horizontal vibration component can be controlled by the mass element, the stiffness element and the eddy current damping element in the inner box body, and the torsional vibration component can be controlled by the torsional stiffness element and the eddy current damping element in the outer box body. The multi-dimensional eddy current tuned mass damper of the present invention is convenient to adjust in terms of mass, stiffness and damping parameters. the mass parameter of the damper can be controlled by adjusting the mass of the mass blocks 8; the stiffness parameter of the damper can be controlled by adjusting the tension springs 13 and the torsion springs 15; and the damping parameter can be adjusted by adjusting the distance between the permanent magnets 5 and the copper ring 2 or copperplates 10, or adjusting the magnetic field intensity of the permanent magnets 5.

It should be noted during the design of the present invention that: first, the limiting angle steels 9 should have sufficient strength and stiffness to prevent the mass blocks 8 from colliding with the limiting angle steels and being damaged, and the limiting angle steels can also be covered with rubber pads on the surface for protection and energy dissipation; second, the rolling balls a 6 and the rolling balls b 14 are respectively embedded in the ball grooves a 19 and the ball grooves b 7, lubricating oil is appropriately applied in the ball grooves a 19 and the ball grooves b 7 to facilitate ball rolling, and the size and quantity of the rolling balls can be adjusted as required since the rolling balls a 6 bear the weight of the whole inner box body; and third, the layout position of the present invention in an engineering structure should be reasonably arranged according to the corresponding vibration reduction scheme and control objective.

The above embodiments are only used for describing the technical solution of the present invention rather than limiting the same. Although the present invention is described in detail by referring to the above embodiments, those ordinary skilled in the art should understand that: the technical solution recorded in each of the above embodiments can be still amended, or some technical features therein can be replaced equivalently. However, these amendments or replacements do not enable the essence of the corresponding technical solution to depart from the spirit and the scope of the technical solution of various embodiments of the present invention.

The invention claimed is:

1. A multi-dimensional eddy current tuned mass damper, comprising hollow cylinders, cover plates, rolling balls, a copper ring (2), connecting plates (4), permanent magnets (5), mass blocks (8), limiting angle steels (9), copperplates (10), vertical poles (11), horizontal poles (12), tension springs (13) and torsion springs (15);

a main body of the multi-dimensional eddy current tuned mass damper is composed of two hollow cylinders, wherein an inner hollow cylinder (3) is located in an outer hollow cylinder (1), ball grooves a (19) are formed in the opposite upper and lower walls of the inner and outer hollow cylinders, rolling balls a (6) are installed in the ball grooves a (19), and the inner hollow cylinder (3) is rotated in the outer hollow cylinder (1) through the rolling balls a (6); the inner hollow cylinder (3) is provided with an inner cover plate (18), and the outer hollow cylinder (1) is provided with an outer cover plate (17), forming a relatively closed box body structure;

an orthogonal bidirectional mass element, a stiffness element and an eddy current damping element are arranged in the inner hollow cylinder (3), and a torsional stiffness element and an eddy current damping element are arranged between the inner hollow cylinder (3) and the outer hollow cylinder (1);

the orthogonal bidirectional mass element is mainly composed of the connecting plates (4) and the mass blocks (8), two connecting plates (4) are horizontal and perpendicular to each other to form a cross, and both ends of each connecting plate are fixedly connected with the mass blocks (8); ball grooves b (7) are formed in the mass blocks (8) and the opposite upper and lower walls of the inner hollow cylinder (3), rolling balls b (14) are installed in the ball grooves b (7), the mass blocks (8) slide in the inner hollow cylinder (3) through the rolling balls b (14), and the limiting angle steels (9) are arranged on both ends of each mass block (8) along the moving direction to avoid collision between adjacent mass blocks (8);

the stiffness element is mainly composed of the vertical poles (11), the horizontal poles (12) and the tension springs (13), each horizontal pole (12) penetrates through a pore canal preformed in the connecting plates (4), and the horizontal poles (12) are parallel to the motion track of each corresponding mass block (8); the tension springs (13) are sheathed on both ends of each horizontal pole (12) and limited between the connecting plates (4) and the vertical poles (11); both ends of each vertical pole (11) are respectively in rigid connection with the horizontal poles (12) and the bottom surface of the inner hollow cylinder (3);

the eddy current damping element in the inner hollow cylinder (3) is mainly composed of the permanent magnets (5) and the copperplates (10), the permanent magnets (5) are embedded in pore spaces preformed in a side wall of the inner hollow cylinder (3), and the copperplates (10) are fixed on one side of each mass block (8);

the torsional stiffness element is composed of the torsion springs (15) which are respectively fixed between the inner cover plate (18) and the outer cover plate (17) and between the bottom of the inner hollow cylinder (3) and the bottom of the outer hollow cylinder (1);

the eddy current damping element in the outer hollow cylinder (1) is mainly composed of the permanent magnets (5) and the copper ring (2), and the copper ring (2) is fixed on an inner wall of the outer hollow cylinder (1).

2. The multi-dimensional eddy current tuned mass damper according to claim 1, wherein the outer hollow cylinder (1), the inner hollow cylinder (3), the connecting plates (4) and the mass blocks (8) are all made of magnetic conductive materials; and the rolling balls are spherical steel balls.

\* \* \* \* \*